US009678882B2

(12) United States Patent
Avudaiyappan et al.

(10) Patent No.: US 9,678,882 B2
(45) Date of Patent: Jun. 13, 2017

(54) SYSTEMS AND METHODS FOR NON-BLOCKING IMPLEMENTATION OF CACHE FLUSH INSTRUCTIONS

(71) Applicant: Intel Corporation, Santa Clara, CA (US)

(72) Inventors: Karthikeyan Avudaiyappan, Sunnyvale, CA (US); Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 606 days.

(21) Appl. No.: 13/649,532

(22) Filed: Oct. 11, 2012

(65) Prior Publication Data

US 2014/0108730 A1 Apr. 17, 2014

(51) Int. Cl.
*G06F 12/00* (2006.01)
*G06F 12/0891* (2016.01)
*G06F 12/0811* (2016.01)

(52) U.S. Cl.
CPC ...... *G06F 12/0891* (2013.01); *G06F 12/0811* (2013.01)

(58) Field of Classification Search
CPC .................................................. G06F 12/0811
USPC ........................................................ 711/122
See application file for complete search history.

(56) References Cited

U.S. PATENT DOCUMENTS 4,075,704 A 2/1978 O'Leary
4,245,344 A 1/1981 Richter
4,356,550 A 10/1982 Katzman et al.
4,414,624 A 11/1983 Summer, Jr. et al.
4,524,415 A 6/1985 Mills, Jr. et al.
4,527,237 A 7/1985 Frieder et al.
4,577,273 A 3/1986 Hoppert et al.
4,597,061 A 6/1986 Cline et al.
4,600,986 A 7/1986 Scheuneman et al.
4,633,434 A 12/1986 Scheuneman
4,682,281 A 7/1987 Woffinden et al.
(Continued)

FOREIGN PATENT DOCUMENTS

CN 1305150 8/2008
EP 0596636 5/1994
(Continued)

OTHER PUBLICATIONS

Barham et al., "Xen and the Art of Virtualization," ACM Symposium on Operating Systems Principles, Oct. 19, 2003, pp. 164-177.
Ashwini K. Nanda; et al. "The Misprediction Recovery Cache"; International Journal of Parallel Programming, vol. 26, No. 4; 1998 Plenum Publishing Corporation; pp. 383-415.
(Continued)

*Primary Examiner* — Prasith Thammavong
(74) *Attorney, Agent, or Firm* — Nicholson De Vos Webster & Elliott, LLP

(57) ABSTRACT

Systems and methods for non-blocking implementation of cache flush instructions are disclosed. As a part of a method, data is accessed that is received in a write-back data holding buffer from a cache flushing operation, the data is flagged with a processor identifier and a serialization flag, and responsive to the flagging, the cache is notified that the cache flush is completed. Subsequent to the notifying, access is provided to data then present in the write-back data holding buffer to determine if data then present in the write-back data holding buffer is flagged.

20 Claims, 6 Drawing Sheets

100

(56) References Cited

U.S. PATENT DOCUMENTS 4,816,991 A 3/1989 Watanabe et al.
4,920,477 A 4/1990 Colwell et al.
5,294,897 A 3/1994 Notani et al.
5,317,705 A 5/1994 Gannon et al.
5,317,754 A 5/1994 Blandy et al.
5,548,742 A 8/1996 Wang et al.
5,559,986 A 9/1996 Alpert et al.
5,574,878 A 11/1996 Onodera et al.
5,634,068 A 5/1997 Nishtala et al.
5,752,260 A 5/1998 Liu
5,754,818 A 5/1998 Mohamed
5,787,494 A 7/1998 DeLano et al.
5,793,941 A 8/1998 Pencis et al.
5,802,602 A 9/1998 Rahman et al.
5,806,085 A 9/1998 Berliner
5,813,031 A 9/1998 Chou et al.
5,835,951 A 11/1998 McMahan
5,852,738 A 12/1998 Beakowski et al.
5,860,146 A 1/1999 Vishin et al.
5,864,657 A * 1/1999 Stiffler ............................ 714/15
5,872,985 A 2/1999 Kimura
5,881,277 A 3/1999 Bondi et al.
5,903,750 A 5/1999 Yeh et al.
5,905,509 A 5/1999 Jones et al.
5,918,251 A 6/1999 Yamada et al.
5,956,753 A 9/1999 Glew et al.
5,974,506 A 10/1999 Sicola et al.
6,016,533 A 1/2000 Tran
6,073,230 A 6/2000 Pickett et al.
6,075,938 A 6/2000 Bugnion et al.
6,088,780 A 7/2000 Yamada et al.
6,092,172 A 7/2000 Nishimoto et al.
6,101,577 A 8/2000 Tran
6,115,809 A 9/2000 Mattson, Jr. et al.
6,134,634 A 10/2000 Marshall, Jr. et al.
6,138,226 A 10/2000 Yoshioka et al.
6,157,998 A 12/2000 Rupley, II et al.
6,167,490 A 12/2000 Levy et al.
6,205,545 B1 3/2001 Shah et al.
6,212,613 B1 4/2001 Belair
6,226,732 B1 5/2001 Pei et al.
6,247,097 B1 6/2001 Sinharoy
6,253,316 B1 6/2001 Tran et al.
6,256,727 B1 7/2001 McDonald
6,256,728 B1 7/2001 Witt et al.
6,260,131 B1 7/2001 Kikuta et al.
6,260,138 B1 7/2001 Harris
6,272,662 B1 8/2001 Jadav et al.
6,275,917 B1 8/2001 Okada
6,321,298 B1 11/2001 Hubis
6,332,189 B1 12/2001 Baweja et al.
6,341,324 B1 1/2002 Caulk, Jr. et al.
6,437,789 B1 8/2002 Tidwell et al.
6,449,671 B1 9/2002 Patkar et al.
6,457,120 B1 9/2002 Sinharoy
6,557,083 B1 4/2003 Sperber et al.
6,594,755 B1 7/2003 Nuechterlein et al.
6,604,187 B1 8/2003 McGrath et al.
6,609,189 B1 8/2003 Kuszmaul et al.
6,658,549 B2 12/2003 Wilson et al.
6,681,395 B1 1/2004 Nishi
6,907,600 B2 6/2005 Neiger et al.
6,912,644 B1 6/2005 O'Connor et al.
7,007,108 B2 * 2/2006 Emerson et al. ................. 710/4
7,111,145 B1 9/2006 Chen et al.
7,143,273 B2 11/2006 Miller et al.
7,149,872 B2 12/2006 Rozas et al.
7,213,106 B1 5/2007 Koster et
7,278,030 B1 10/2007 Chen et al.
7,380,096 B1 5/2008 Rozas et al.
7,406,581 B2 7/2008 Southwell
7,546,420 B1 6/2009 Shar et al.
7,680,988 B1 3/2010 Nickolls et al.
7,783,868 B2 8/2010 Ukai
7,856,530 B1 12/2010 Mu
7,913,058 B2 3/2011 Rozas et al.
8,145,844 B2 3/2012 Bruce
8,239,656 B2 8/2012 Rozas et al.
8,301,847 B2 10/2012 Dantzig et al.
8,522,253 B1 8/2013 Rozas et al.
8,868,838 B1 10/2014 Glasco et al.
8,930,674 B2 1/2015 Avudaiyappan et al.
9,047,178 B2 * 6/2015 Talagala .............. G06F 12/0246
2001/0049782 A1 12/2001 Hsu et al.
2002/0069326 A1 6/2002 Richardson et al.
2002/0082824 A1 6/2002 Neiger et al.
2002/0099913 A1 7/2002 Steely, Jr.
2003/0065887 A1 4/2003 Maiyuran et al.
2003/0088752 A1 5/2003 Harman
2004/0034762 A1 2/2004 Kacevas
2004/0044850 A1 3/2004 George et al.
2004/0064668 A1 4/2004 Kjos et al.
2004/0093483 A1 5/2004 Nguyen et al.
2004/0117593 A1 6/2004 Uhlig et al.
2004/0117594 A1 6/2004 VanderSpek
2004/0143727 A1 7/2004 McDonald
2004/0193857 A1 9/2004 Miller et al.
2004/0205296 A1 10/2004 Bearden
2004/0215886 A1 10/2004 Cargnoni et al.
2004/0225872 A1 11/2004 Bonanno et al.
2005/0005085 A1 1/2005 Miyanaga
2005/0027961 A1 2/2005 Zhang
2005/0060457 A1 3/2005 Olukotun
2005/0108480 A1 5/2005 Correale, Jr. et al.
2005/0154867 A1 7/2005 DeWitt et al.
2006/0004964 A1 1/2006 Conti et al.
2006/0026381 A1 2/2006 Doi et al.
2006/0190707 A1 8/2006 McIlvaine et al.
2006/0236074 A1 10/2006 Williamson et al.
2006/0277365 A1 12/2006 Pong
2008/0077813 A1 3/2008 Keller et al.
2008/0091880 A1 4/2008 Vishin
2008/0126771 A1 5/2008 Chen et al.
2008/0195844 A1 8/2008 Shen et al.
2008/0215865 A1 9/2008 Hino et al.
2008/0235500 A1 9/2008 Davis et al.
2008/0270758 A1 10/2008 Ozer et al.
2008/0270774 A1 10/2008 Singh et al.
2008/0282037 A1 11/2008 Kusachi et al.
2009/0138659 A1 5/2009 Lauterbach
2009/0157980 A1 6/2009 Bruce
2009/0158017 A1 6/2009 Mutlu et al.
2009/0164733 A1 6/2009 Kim et al.
2009/0172344 A1 7/2009 Grochwski et al.
2009/0287912 A1 11/2009 Sendag
2010/0138607 A1 6/2010 Hughes et al.
2010/0169578 A1 7/2010 Nychka et al.
2010/0169611 A1 7/2010 Chou et al.
2010/0211746 A1 8/2010 Tsukishiro
2011/0010521 A1 1/2011 Wang et al.
2011/0082980 A1 4/2011 Gschwind et al.
2011/0082983 A1 4/2011 Koktan
2011/0153955 A1 6/2011 Herrenschmidt et al.
2012/0005462 A1 1/2012 Hall et al.
2012/0042126 A1 2/2012 Krick et al.
2013/0019047 A1 1/2013 Podvalny et al.
2013/0046934 A1 2/2013 Nychka et al.
2013/0086417 A1 * 4/2013 Sivaramakrishnan et al. ............................ 714/6.13
2013/0097369 A1 * 4/2013 Talagala et al. .............. 711/103
2013/0238874 A1 9/2013 Avudaiyappan et al.
2013/0304991 A1 11/2013 Bottcher et al.
2013/0311759 A1 11/2013 Abdallah
2013/0346699 A1 12/2013 Walker
2014/0032844 A1 1/2014 Avudaiyappan et al.
2014/0032845 A1 1/2014 Avudaiyappan et al.
2014/0032856 A1 1/2014 Avudaiyappan et al.
2014/0075168 A1 3/2014 Abdallah
2014/0108730 A1 4/2014 Avudaiyappan et al.
2014/0156947 A1 6/2014 Avudaiyappan et al.
2014/0281242 A1 9/2014 Abdallah et al.

(56) References Cited

U.S. PATENT DOCUMENTS

| | | |
|---|---|---|
| 2016/0041908 A1 | 2/2016 | Avudaiyappan et al. |
| 2016/0041913 A1 | 2/2016 | Avudaiyappan et al. |
| 2016/0041930 A1 | 2/2016 | Avudaiyappan et al. |

FOREIGN PATENT DOCUMENTS

| | | |
|---|---|---|
| EP | 0706133 | 4/1996 |
| GB | 2343270 | 5/2000 |
| TW | 200707284 | 3/1995 |
| TW | 539996 | 7/2003 |
| TW | 200401187 | 1/2004 |
| TW | 591530 | 6/2004 |
| TW | I233545 | 6/2005 |
| TW | I281121 | 5/2007 |
| WO | 0125921 | 4/2001 |

OTHER PUBLICATIONS

Jiongyao Ye; et al.; "A New Recovery Mechanism in Superscalar Microprocessors by Recovering Critical Misprediction"; IEICE Trans. Fundamentals, vol. E94-A, No. 12; Dec. 2011; pp. 2639-2648.

Path-Based Next Trace Prediction' by Jacobson et al, Copyright 1997 by IEEE.

"The Power of Indexing" by John Garmany, Archived Mar. 9, 2009.

Trace Cache: A Low Latency Approach to High Bandwidth Instruction Fetching' by Eric Rotenberg et al., Apr. 11, 1996.

Wallace, S. et al, Multiple branch and block prediction, in: the 3rd international symposium on high-performance computer architecture, Feb. 1-5, 1997, 94-103, IEEE.

Yeh, T. et al, Increasing the instruction fetch rate via multiple branch prediction and a branch address cache, IN: the 7th international conference on supercomputing, 1993, 67-76, ACM, New York.

* cited by examiner

SYSTEMS AND METHODS FOR NON-BLOCKING IMPLEMENTATION OF CACHE FLUSH INSTRUCTIONS

Modern microprocessors operate much faster than associated memories where program data is kept. In particular, main memories operate much slower than do modern microprocessors. Because of this, program data may not be able to be read fast enough to keep a microprocessor busy. Moreover, the performance gap creates a bottleneck that is the source of latency. Cache memory is used to help ameliorate the performance gap that exists between processors and main memory. Cache memory is memory that is smaller in storage capacity than main memory, but is memory that can be accessed much more quickly than can main memory.

As such, cache memory is used by the central processing unit of a computer to reduce the time that it takes to access data and instructions associated with the execution of an application. Cache memory is small, high speed memory, usually static RAM, which stores copies of data and instructions accessed from the most recently used main memory locations. As long as data and instructions are accessed from cached memory locations, the latency associated with data and instruction accesses is that of cache memory accesses as opposed to being that of main memory accesses, which are much slower. Cache memory improves latency by decreasing the time that it takes to move information to and from the processor.

Cache flushing is the intentional removal of information from a cache. Individual modified or dirty cache lines can be evicted from a cache and written into main memory in an operation called a write-back. The write-back updates the version of the cache line that is stored in main memory. A write-back may result from actions in either hardware or software. If the write-back was initiated by software, as a result of the execution of a cache flush instruction, after the processor finishes the write-backs, it then generates a special bus cycle called a flush acknowledge cycle.

In conventional processors, when a flush of data from a cache is requested, the processor is stalled until the flush of data to main memory or the next level of cache is completed. As such, latency that is attributable to the period during which the processor waits for the write backs to complete is incurred. Accordingly, some conventional processors exhibit an unsatisfactory latency that is attributable to the waiting period that is associated with write-backs to main memory (or other locations).

SUMMARY

Conventional processors exhibit an unsatisfactory latency that is attributable to the waiting period that is associated with data write-backs. A method for non-blocking implementation of cache flush instructions is disclosed that addresses these shortcomings. However, the claimed embodiments are not limited to implementations that address any or all of the aforementioned shortcomings. As a part of a method, data is accessed that is received in a write-back data holding buffer from a cache flushing operation, the data is flagged with a processor identifier and a serialization flag, and responsive to the flagging, the processor executing the cache flush instruction is prematurely/expediently notified that the cache flush operation is completed. Subsequent to such notification, access is provided to data then present in the write-back data holding buffer to determine if data then present in the write-back data holding buffer is flagged. The aforementioned methodology does not require a waiting period during which the processor waits (e.g., is stalled) for write-backs to complete. Accordingly, the aforementioned methodology avoids unsatisfactory latency that is attributable to the waiting period that is associated with data flushes in conventional processors.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
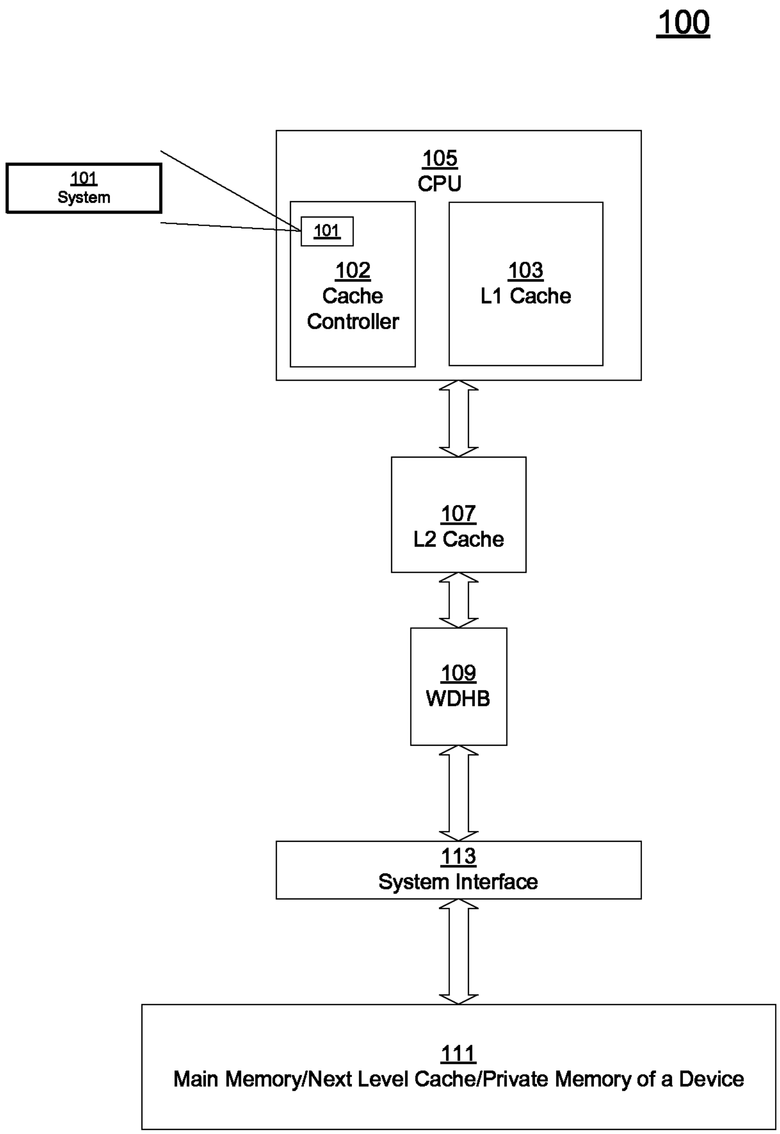
FIG. 1A shows an exemplary operating environment of a system for non-blocking implementation of cache flush instructions according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "accessing" or "flagging" or "notifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of a System for Non-Blocking Implementation of Cache Flush Instructions According to One Embodiment FIG. 1A shows an exemplary operating environment 100 of a system 101 for non-blocking implementation of cache flush instructions according to one embodiment. System 101 accesses data received by a write-back data holding buffer as a result of software initiated cache flushing operations, flags the data and notifies the cache that a write-back of the data to main memory/next level cache/private memory of device has completed before the write-back of the data to main memory/next level cache/private memory of device has actually completed. Subsequently, access to the write-back data holding buffer is provided to a serialization operation to determine if data that is then present in the write-back data holding buffer has been flagged. System 101 enables an efficient flushing of L2 cache, such that processor stalls, that are attributable to a necessity to wait for write-backs to main memory/next level cache/private memory of device to complete, before making L2 cache available for new/fresh data, are prevented. FIG. 1A shows system 101, cache controller 102, L1 cache 103, CPU 105, L2 cache 107, WDHB (write-back data holding buffer) 109, main memory/next level cache/private memory of device 111 and system interface 113.

Referring to FIG. 1A, L1 cache 103 is a level 1 cache and L2 cache 107 is a level 2 cache. In one embodiment, when a software based request is made to flush modified data from L2 cache 107, a copy of the modified data is written back to main memory/next level cache/private memory of device 111, replacing the old data located therein. In one embodiment, when a request to flush data from L2 cache 107 is made the data is flushed from L2 cache 107 into WDHB 109. In one embodiment, an indicator that the data has been flushed to main memory/next level cache/private memory of device 111 is provided to L2 cache 107 when the data is flushed into WDHB 109. The processor is then freed to receive new/fresh instructions that are needed by the software executing on the processor. In this manner, because requests to flush data typically involve blocking instructions, the blocking instruction is removed and the processor is not forced to wait until the write-back of the data to main memory/next level cache/private memory of device is actually completed before it can resume processing new requests. In conventional systems, it can take several hundred cycles for flushed data to reach main memory/next level cache/private memory of device 111. Accordingly, in exemplary embodiments, processor stalls that are attributable to such delays are avoided.

Figure 1B:
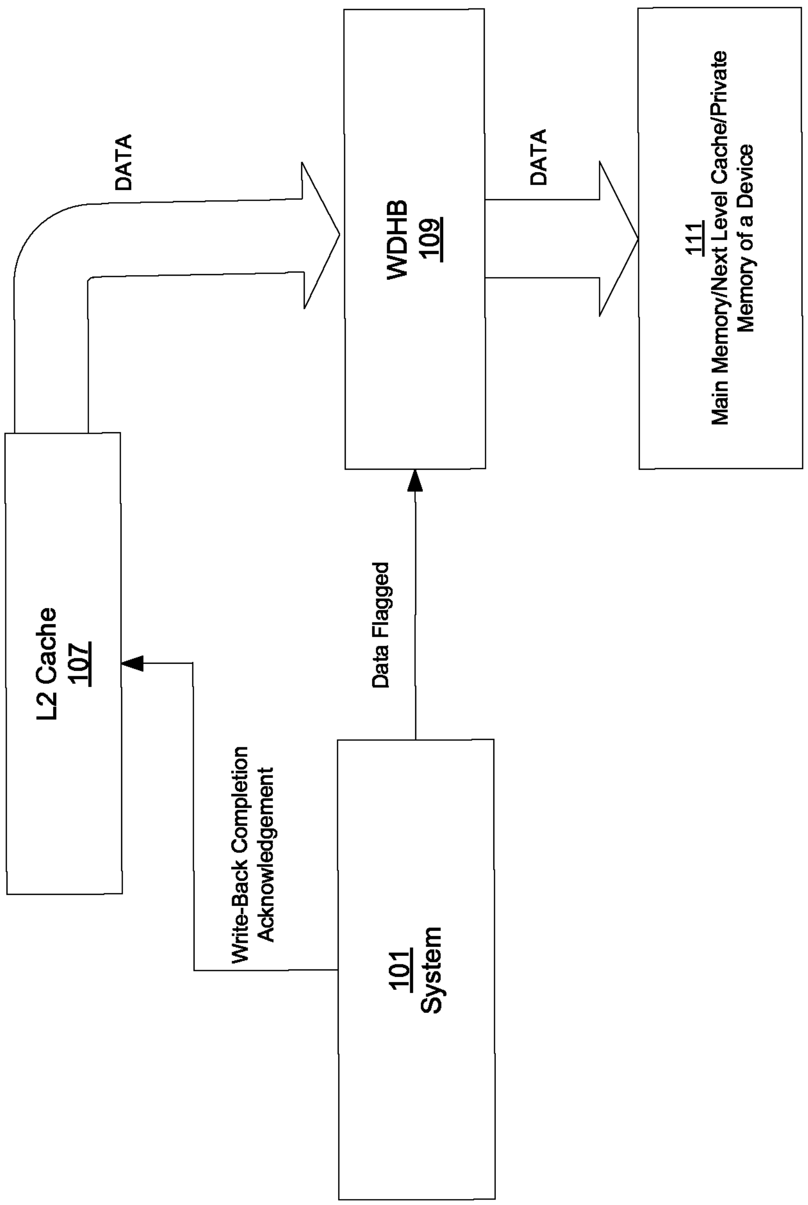
FIG. 1B shows how the data that is temporarily held in the data holding buffer is tagged and thereafter an indicator that the data has been completely flushed to a main memory/next level cache/private memory of a device is provided to L2 cache.

WDHB 109 receives data that is flushed from L2 cache 107 based on a software based request to flush the data to main memory/next level cache/private memory of device. WDHB 109 is a temporary data holding buffer that temporarily holds data that is in the process of being flushed from L2 cache 107 to main memory/next level cache/private memory of a device 111. In one embodiment, as shown in FIG. 1B, the flushed data that is temporarily held in WDHB 109 is flagged (e.g., with a processor identifier and a serialization flag). And, thereafter an indicator that the data has been completely flushed to main memory/next level cache/private memory of a device 111 is provided to L2 cache 107 (e.g., a write-back acknowledgement is provided to L2 cache 107 in response to the flagging and before the data is actually written back to main memory/next level cache/private memory of a device).

Figure 1C:
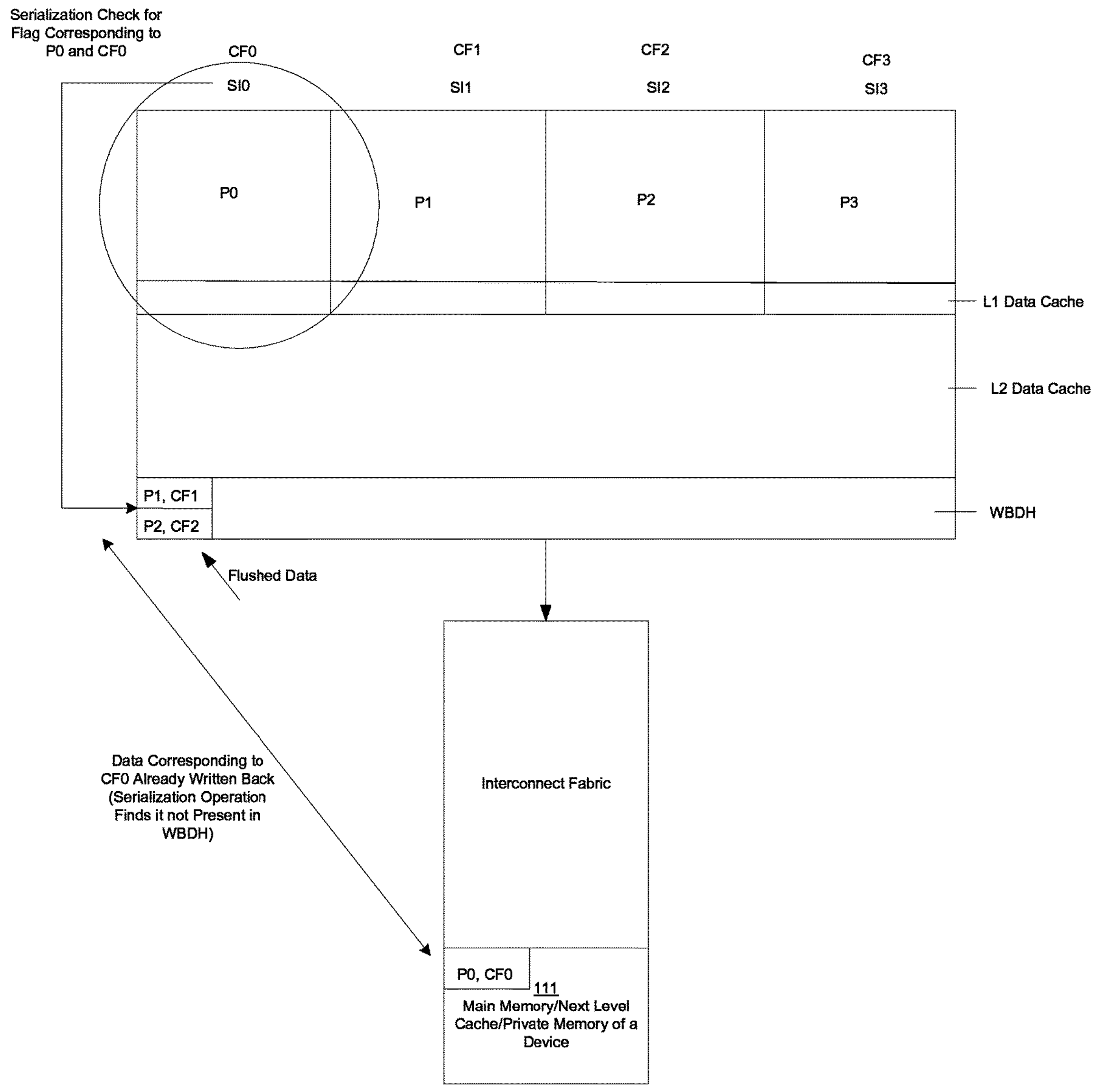
FIG. 1C illustrates how the flagging of data enables data associated with a specific processor core and a specific cache flush to be distinguished from other data that is associated with other processor cores and cache flushes that can be extant on a chip.

In one embodiment, as illustrated in FIG. 1C, the flagging enables data associated with a specific processor core (e.g., one of P0-P3) and a specific flush (e.g., one of CF0-CF3) to be distinguished from other data in WDHB 109 that is associated with other processor cores and flushes that can be extant on a chip. In this manner a serialization operation (e.g., one of SI0-SI3) can readily identify data held in WDHB 109 that is associated with a corresponding processor core and data flush request, and can operate to block the execution of subsequent instructions in the software that includes the serialization instruction, until the write-back of the identified data is completed. In one embodiment, because the execution of the instructions that are executed, after the flush request is executed, and before the serialization instruction is executed, can take many cycles, the data that is caused to be flushed by a flush request is typically already written back to main memory/next level cache/private memory of a device 111 at the point in time when the serialization instruction is executed (see flushed data P0, CF0 in FIG. 1C); the data that is temporarily held in WDHB 109 having been forwarded to main memory/next level cache/private memory of a device 111 when the forwarding of the data to main memory/next level cache/private memory of device is approved by the interconnect fabric.

Referring again to FIG. 1A, system 101 accesses data that is received by WDHB 109 as a result of a cache flushing operation (as illustrated in FIG. 1B). The data that is placed into WDHB 109 is flagged by system 101 with a processor identifier and a serialization flag (as illustrated in FIG. 1B). Prior to the completion of the flush of the data to main memory/next level cache/private memory of device and responsive to the flagging of the data, a cache completion indicator is provided by system 101 to L2 cache 107 (as illustrated in FIG. 1B). Subsequently, system 101 provides access to data held in WDHB 109 to determine if data that is then present therein is flagged (see above discussion). In one embodiment, system 101 can be located in cache controller 102. In other embodiments, system 101 can be separate from cache controller 102 but operate cooperatively therewith.

Main Memory/Next Level Cache/Private Memory of Device 111 stores data that is flushed from L2 cache 107 to main memory/next level cache/private memory of device 111 via WDHB 109. Having been placed into WDHB 109 to avoid blocking the ingress of data into L2 cache 107, data is moved to main memory/next level cache/private memory of device 111 when the interconnect fabric authorizes the forwarding of the data from WDHB 109. The data that is flushed to main memory/next level cache/private memory of device from L2 cache 107 updates the data that is stored in the involved address of main memory/next level cache/private memory of device 111. Also shown in FIG. 1A is system interface 113.

Operation

Figure 1D:
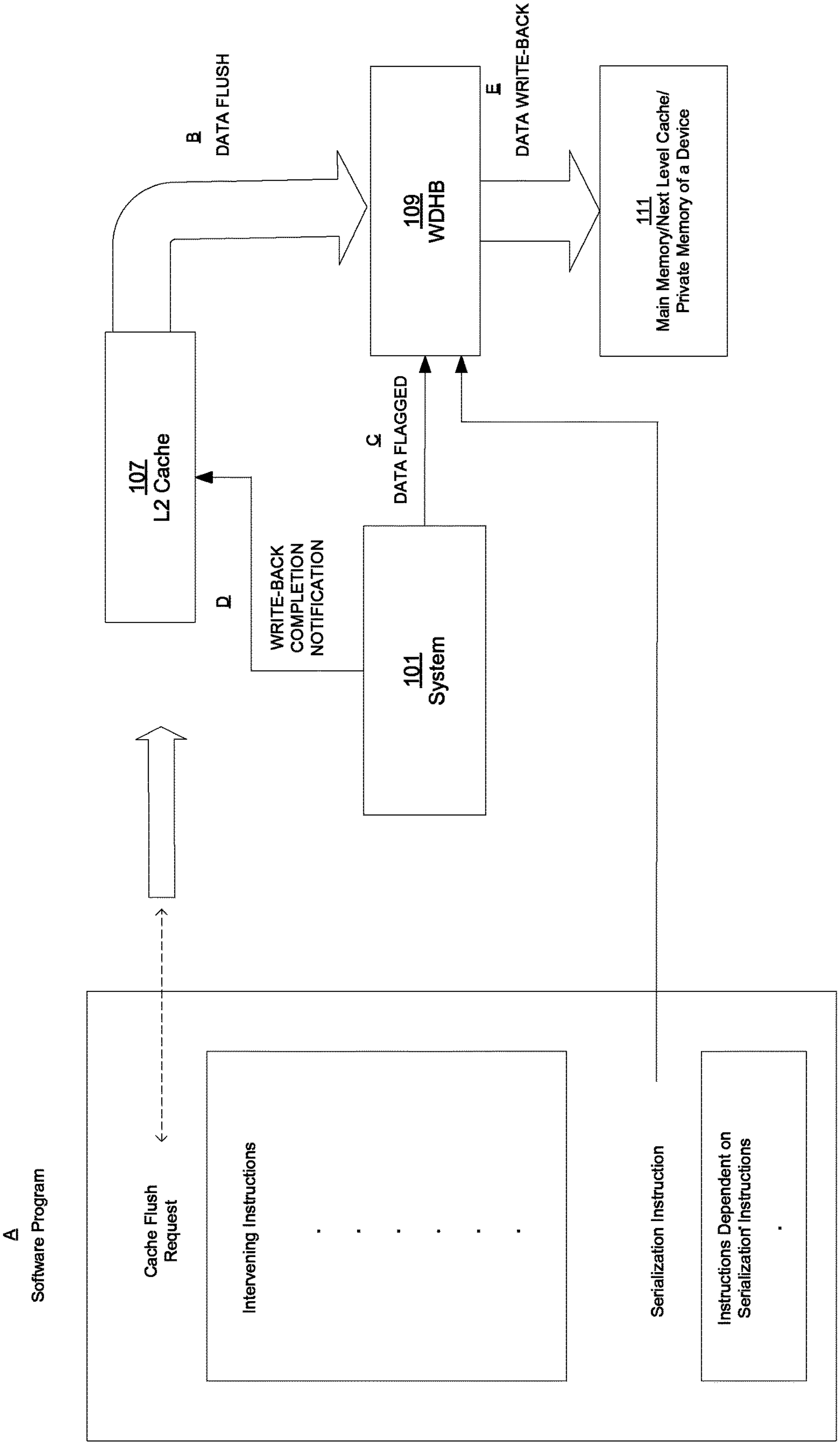
FIG. 1D illustrates operations performed by system for non-blocking implementation of cache flush instructions according to one embodiment.

FIG. 1D illustrates operations performed by system 101 for non-blocking implementation of cache flush instructions according to one embodiment. These operations, which relate to the implementation of cache flush instructions are illustrated for purposes of clarity and brevity. It should be appreciated that other operations not illustrated by FIG. 1D can be performed in accordance with one embodiment.

Referring to FIG. 1D, at A, a software based cache flush request is made. In one embodiment, the software based cache flush request is implemented as an instruction that is a part of the software. In one embodiment, the instruction causes the flushing of modified data from L2 cache 107 that is to be written back to main memory/next level cache/private memory of device 111.

At B, data is flushed from L2 cache 107 and forwarded to WDHB 109. In one embodiment, WDHB 109 has an 8 entry data holding capacity. In other embodiments, WDHB 109 can have other data holding capacities.

At C, system 101 accesses the data that is received by WDHB 109 and flags the data with a processor identifier and a serialization flag. In one embodiment, the processor identifier and the serialization flag refer to a specific processor and a specific cache flush.

At D, responsive to the flagging of the data, L2 cache 107 is notified that the cache flush has been completed (that the data has been written back to main memory/next level cache/private memory of device 111). In one embodiment, L2 cache 107 is notified that the cache flush has been completed, in response to the flagging of the data and before the data is actually written-back to main memory/next level cache/private memory of device 111.

At E, the data that is flushed from L2 cache 107 is written-back to main memory/next level cache/private memory of device 111. At F, access to the contents of the write-back data holding buffer is provided to a serialization instruction in the software program that initiated the cache flush request. The serialization instruction ensures that the write-back of data is completed before subsequent instructions in the software program can be executed. The serialization operation uses the flags to identify data held in WDHB 109 that is associated with a specific processor core and data flush request, and blocks the execution of subsequent instructions, until the write-back of the identified data is completed.

Figure 2:
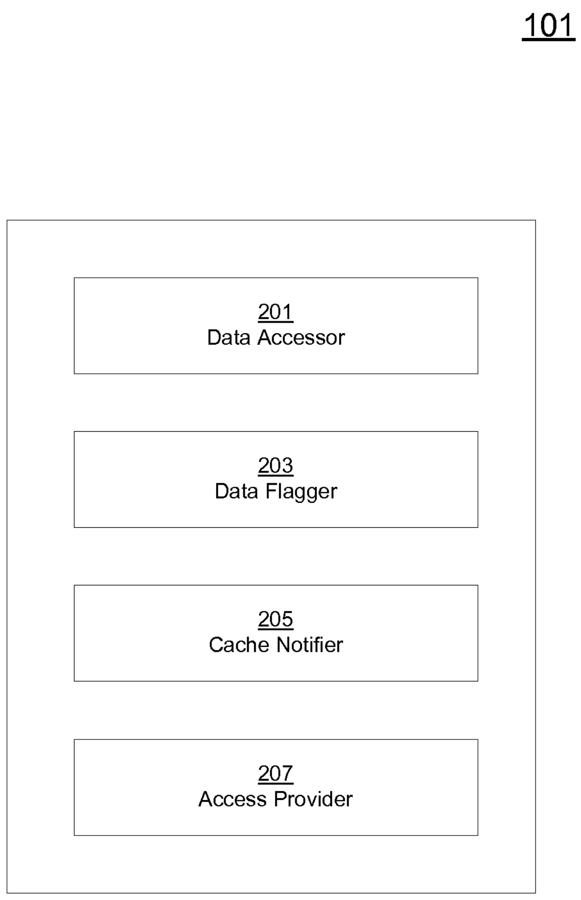
FIG. 2 shows components of a system for non-blocking implementation of cache flush instructions according to one embodiment.

Components of System for Non-Blocking Implementation of Cache Flush Instructions According to One Embodiment FIG. 2 shows components of a system 101 for non-blocking implementation of cache flush instructions according to one embodiment. In one embodiment, components of system 101 implement an algorithm for non-blocking implementation of cache flush instructions. In the FIG. 2 embodiment, components of system 101 include data accessor 201, data flagger 203, cache notifier 205 and access provider 207.

Referring to FIG. 2, data accessor 201 accesses data that is received by a write-back data holding buffer (e.g., WDHB 109 in FIG. 1A) as part of a cache flushing operation. In one embodiment, the data is that is received is received from L2 cache (e.g., 107 in FIG. 1A) en route to main memory/next level cache/private memory of device (e.g., 111 in FIG. 1A). In one embodiment, the write-back data holding buffer temporarily holds the data until the interconnect fabric indicates that the data that is being temporarily held in the write-back holding buffer can be forwarded onward.

Data flagger 203 flags the data that is flushed to the write-back data holding buffer with a processor identifier and a serialization flag. In one embodiment, the flagging enables data associated with a specific processor core and a specific flush to be identified from among other data associated with various other processor cores and flushes that are extant on a chip.

Cache notifier 205, responsive to the flagging, notifies L2 cache that a flush of the flagged data has been completed (e.g., that the data has been written back to main memory/next level cache/private memory of device). In one embodiment, the notification is provided to L2 cache prior to the completion of the flush of the flagged data to main memory/next level cache/private memory of device.

Access provider 207, after a cache flush completion notification is provided to the cache, provides access to the data that is then present in the write-back holding buffer, such that it can be determined if the data then present in the write-back data holding buffer is flagged. In one embodiment, access is provided to a serialization instruction, which determines if any of the data then present in the write-back data holding buffer is flagged.

It should be appreciated that the aforementioned components of system 101 can be implemented in hardware or software or in a combination of both. In one embodiment, components and operations of system 101 can be encompassed by components and operations of one or more computer components or operations (e.g., cache controller 102 in FIG. 1A). In another embodiment, components and operations of system 101 can be separate from the aforementioned one or more computer components or operations but can operate cooperatively with components and operations thereof.

Figure 3:
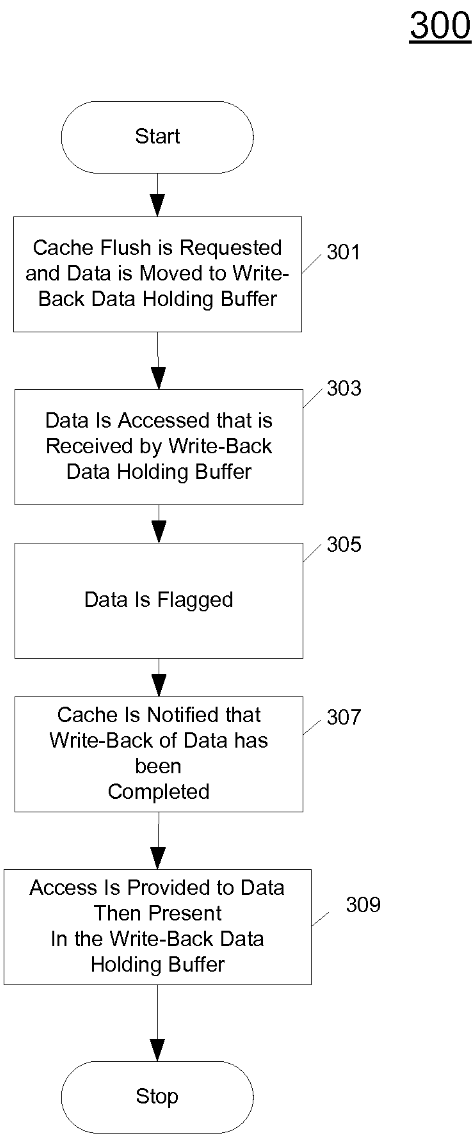
FIG. 3 shows a flowchart of the steps performed in a method for non-blocking implementation of cache flush instructions according to one embodiment.

Method for Non-Blocking Implementation of a Cache Flush Instruction According to One Embodiment FIG. 3 shows a flowchart 300 of the steps performed in a method for non-blocking implementation of cache flush instructions according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, a cache flush request is made and data is flushed to a write-back data holding buffer as a part of cache flushing operations. In one embodiment, the cache flush request is made by a software program that seeks to flush modified data from L2 cache.

At 303, data is accessed that is received by a write-back data holding buffer as a part of the cache flushing operation.

At 305, the flushed data is flagged with a processor identifier and a serialization flag. In one embodiment, as described herein, the flagging enables data associated with a specific processor core and a specific flush to be distinguished from among other data associated with various other processor cores and flushes that can be extant on a chip.

At 307, the L2 cache is notified that a write-back of the data to main memory/next level cache/private memory of device has been completed (that the flush of the data to main memory/next level cache/private memory of device is completed) prior to the actual completion of the write-back of the data to main memory/next level cache/private memory of device. In one embodiment, the cache is notified that a write-back of the data to main memory/next level cache/private memory of device has been completed in response to the flagging of the data.

At 309, subsequent to notifying the L2 cache that a write-back of the flagged data to main memory/next level cache/private memory of device has been completed, access is provided to data then present in the write-back holding buffer to determine if the data then present in the write-back data holding buffer has been flagged.

With regard to exemplary embodiments thereof, systems and methods for efficient cache flushing are disclosed. As a part of a method, data is accessed that is received in a write-back data holding buffer from a cache flushing operation, the data is flagged with a processor identifier and a serialization flag, and responsive to the flagging, the cache is notified that the cache flush is completed. Subsequent to the notifying, access is provided to data then present in the write-back data holding buffer to determine if data then present in the write-back data holding buffer is flagged.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for non-blocking implementation of cache flush instructions, comprising:

accessing data received into a write-back data holding buffer from a software initiated cache flushing operation;

flagging said data with a flag that comprises a processor identifier and a serialization flag, wherein the serialization flag is a flush identifier;

responsive to said flagging, notifying said cache that said cache flushing operation is complete; and subsequent to said notifying, providing access to data then present in said write-back data holding buffer to determine if said data then present in said write-back data holding buffer is flagged.

2. The method of claim 1 wherein data that replaces said data that is received in said write-back data holding buffer in L2 cache replaces said data that is received in said write-back data holding buffer in L2 cache before said cache flushing operation has been completed.

3. The method of claim 1 wherein said notifying is performed before said cache flushing operation is completed.

4. The method of claim 1 wherein said notifying is performed before an execution of a serialization instruction in said software that initiated said cache flushing operation.

5. The method of claim 1 wherein said data remains in said write-back data holding buffer for a period after said notifying is performed.

6. The method of claim 1 wherein said processor identifier identifies a specific processor core among a plurality of processor cores.

7. The method of claim 1 wherein said serialization flag identifies a specific flush operation associated with said processor.

8. A cache controller, comprising:

a system for non-blocking implementation of cache flush instructions, comprising:

an accessing component for accessing data received into a write-back data holding buffer from a cache flushing operation;

a flagging component for flagging said data with a processor identifier and a flush identifier;

a notifying component for, responsive to said tagging, notifying said cache that said cache flushing is completed; and an access providing component for, subsequent to said notifying, providing access to data then present in said write-back data holding buffer to determine if said data then present in said write-back data holding buffer is flagged.

9. The cache controller of claim 8 wherein data that replaces said data that is received in said write-back data holding buffer in L2 cache replaces said data that is received in said write-back data holding buffer in L2 cache before said cache flushing operation has been completed.

10. The cache controller of claim 8 wherein said notifying is performed before said cache flushing operation is completed.

11. The cache controller of claim 8 wherein said notifying is performed before an execution of a serialization instruction in a software program that initiated said cache flushing operation.

12. The cache controller of claim 8 wherein said data remains in said write-back holding buffer for a period after said notifying is performed.

13. The cache controller of claim 8 wherein said processor identifier identifies a specific processor core among a plurality of processor cores.

14. The cache controller of claim 8 wherein said flush identifier identifies a specific flush operation associated with said processor.

15. A processor comprising:

cache components; and cache controller, comprising:

a system for non-blocking implementation of cache flush instructions, comprising:

an accessing component for accessing data received into a write-back data holding buffer from a cache flushing operation;

a flagging component for flagging said data with a processor identifier and a flush identifier;

a notifying component for responsive to said tagging, notifying said cache that said cache flushing is completed; and an access providing component for, subsequent to said notifying, providing access to data then present in said write-back data holding buffer to determine if said data then present in said write-back data holding buffer is flagged.

16. The processor of claim 15 wherein data that replaces said data that is received in said write-back data holding buffer in L2 cache replaces said data that is received in said write-back data holding buffer in L2 cache before said cache flushing operation has been completed.

17. The processor of claim 15 wherein said notifying is performed before said cache flushing operation is completed.

18. The processor of claim 15 wherein said notifying is performed before an execution of a serialization instruction in a software program that initiated said cache flushing operation.

19. The processor of claim 15 wherein said data remains in said write-back holding buffer for a period after said notifying is performed.

20. The processor of claim 15 wherein said processor identifier identifies a specific processor core among a plurality of processor cores.

* * * * *